United States Patent [19]

Shea

[11] Patent Number: 6,012,771

[45] Date of Patent: *Jan. 11, 2000

[54] SEAT FOLD MECHANISM

[75] Inventor: Paul H. Shea, Livonia, Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/130,418

[22] Filed: Aug. 6, 1998

[51] Int. Cl.[7] ................................ B60N 2/02; B60N 2/42
[52] U.S. Cl. ..................... 297/216.1; 297/332; 297/336; 296/65.05; 296/68.1
[58] Field of Search .................... 297/378.11, 378.14, 297/216.1, 216.14, 238, 216.12, 331, 332, 335, 336; 296/68.1, 65.05

[56] References Cited

U.S. PATENT DOCUMENTS

| | | |
|---|---|---|
| 3,873,151 | 3/1975 | Morris et al. . |
| 4,527,828 | 7/1985 | Groce et al. . |
| 4,993,666 | 2/1991 | Baymak et al. . |
| 5,224,756 | 7/1993 | Dukatz et al. ........................ 297/238 |
| 5,320,411 | 6/1994 | Sera . |
| 5,425,568 | 6/1995 | Sliney et al. ...................... 297/378.11 |
| 5,476,307 | 12/1995 | Whalen ............................ 297/378.11 |
| 5,658,043 | 8/1997 | Davidson ........................ 297/216.1 X |

*Primary Examiner*—Anthony D. Barfield
*Attorney, Agent, or Firm*—Roland A. Fuller, III

[57] ABSTRACT

A folding seat assembly is provided for a vehicle including a seat back and a seat bottom pivotally mounted relative to the seat back and movable between a seating position and a folded upright position. A detent mechanism provides a resistance to movement of the seat bottom from the folded upright position and the seating position. An inertia latch mechanism is provided for engaging the seat bottom in the folded upright position in response to a rapid deceleration of the vehicle such as caused by a collision.

6 Claims, 2 Drawing Sheets

SEAT FOLD MECHANISM

BACKGROUND OF THE INVENTION

FIELD OF THE INVENTION

The present invention relates to a folding seat assembly for a vehicle, and more particularly, to a folding seat assembly having a seat bottom pivotally mounted relative to the seat back and movable between a seating position and a folded upright position and including an inertia latch mechanism for engaging the seat bottom in the folded upright position in response to a rapid deceleration of the vehicle.

BACKGROUND AND SUMMARY OF THE INVENTION

It is well known in the automotive industry to have a pickup truck with an extended cab, or what is sometimes called a club-cab. Club-cab pickup trucks provide additional space behind the front seats for additional seating and/or storage. Club-cab pickup trucks provide an alternative to conventional pickup trucks which have limited inside cargo carrying capability as well as limited passenger capability. With its increased passenger carrying and cargo carrying capability, club-cab pickups have become extremely popular in recent years. Along with the increased popularity of the club-cab pickup trucks, has come an increased demand for improved methods for providing seat assemblies which can be converted between a seating position and a folded-up position for increasing the storage space of the passenger compartment of the club-cab pickup truck.

Accordingly, previous designs have provided extended cab pickup trucks with folding rear seat mechanisms wherein the seat back is either folded downward to provide a load floor on the rear surface of the seat back, or the seat bottom is folded upward so that the floor of the vehicle can be utilized for storage. Typically, a manually actuated latch mechanism is provided for holding the seat bottom in the upright position or for holding the seat back in the downward position, as the case may be. The latch mechanism must then be released in order to move the latched seat portion from the storage position to the seating position. However, the necessity for manually releasing a latch mechanism for moving the seat bottom to the seating position is cumbersome to the user. Accordingly, it is an object of the present invention to provide a rear seat for an extended cab pickup truck which does not require handles and manually releasable latches for holding the seat cushion in the seating or upright folded positions.

The present invention provides a folding seat assembly for a vehicle including a seat back and a seat bottom pivotally mounted relative to the seat back and movable between a seating position and a folded upright position. A detent mechanism provides a resistance to movement of the seat bottom from the folded upright position and from the downward. An inertia latch mechanism is provided for engaging the seat bottom in the folded upright position in response to a rapid deceleration of the vehicle. Accordingly, during normal usage of the folding seat assembly, the seat bottom portion can be held in the folded upright position by the detent mechanism which provides a resistance to the movement of the seat bottom from the folded upright position. The detent mechanism provides a slight resistance to movement of the seat bottom, but can be overcome by a user by firmly pulling the seat bottom in a forward direction. In the event of a rapid deceleration of the vehicle, an inertia latch mechanism engages the seat bottom in the folded upright position in order to prevent the seat bottom portion from moving forward from the folded upright position. The detent mechanism provides the resistance to movement of the seat bottom from the seating position. Accordingly, the detent mechanism provides a resistance to movement of the seat bottom from the seating position, but can be overcome by a user firmly lifting upward on the front portion of the seat bottom. Accordingly, the detent mechanism keeps the seat bottom portion from bouncing while in either the seating position or the folded upright position in response to the vehicle hitting small bumps. Thus, undesirable noises and vibrations can be avoided.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
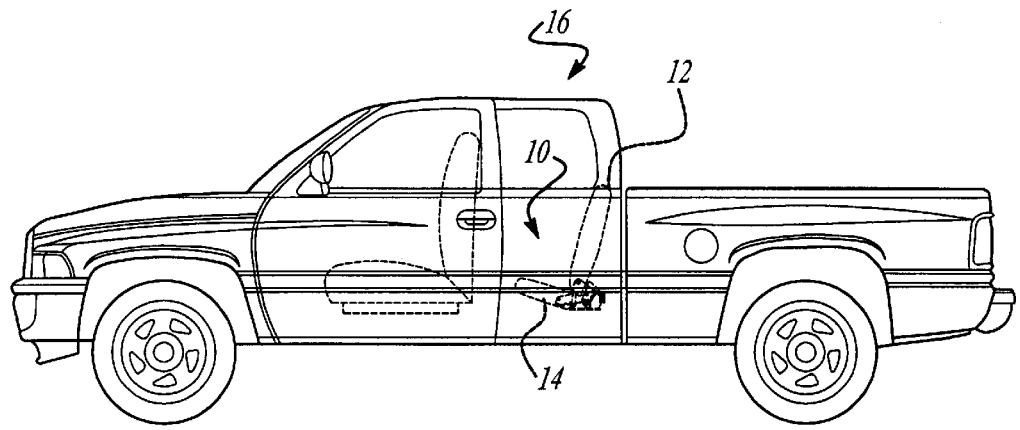
FIG. 1 is a perspective view of a seat assembly according to the principles of the present invention shown in the seating position.
Figure 2:
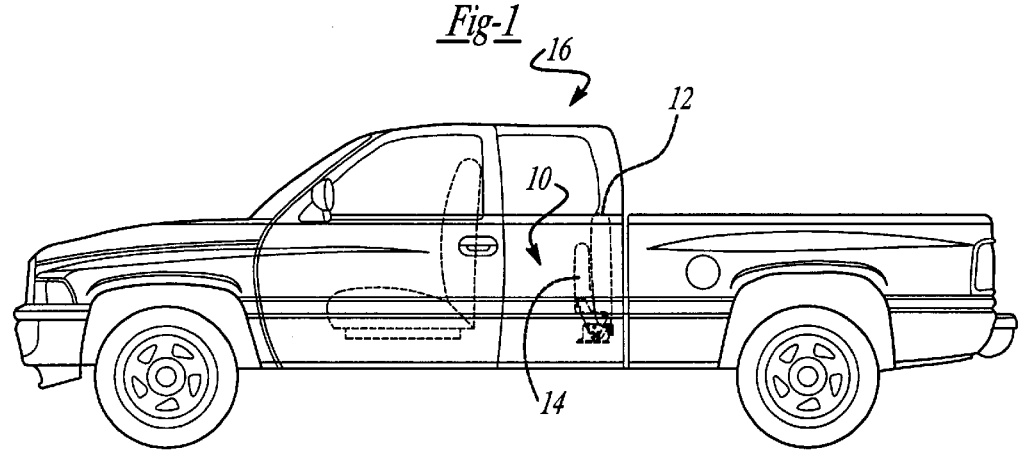
FIG. 2 is a perspective view of the seat assembly shown in FIG. 1 with the seat assembly being in the folded storage position.

With reference to FIGS. 1 and 2, the seat assembly 10 according to the principles of the present invention will be described. Seat assembly 10 includes a seat back portion 12 and a seat bottom portion 14. The seat bottom portion 14 is pivotally mounted relative to the seat back 12 between a seating position (as shown in FIG. 1) and an upright folded position (as shown in FIG. 2). The seat assembly is particularly suitable for use in a vehicle 16, and more particularly, in a vehicle such as an extended cab pickup truck wherein the seat assembly 10 can be utilized in the seating position, as shown in FIG. 1, for providing extra passenger carrying capability, and can be folded to the upright position opposing the seat back 12 such that a top surface 14a of the seat bottom 14 is disposed against a front surface 12a of the seat back 12, as shown in FIG. 2, in order to provide increased load floor cargo carrying capacity.

An inertia latch mechanism 18 is provided for engaging the seat bottom in the folded upright position in response to a rapid deceleration of the vehicle. In addition, a spring detent mechanism 20 is provided for applying a resistance to movement of the seat bottom from the folded upright position (FIG. 2) as well as providing a resistance to movement of the seat bottom from the seating position (FIG. 1).

Figure 3:
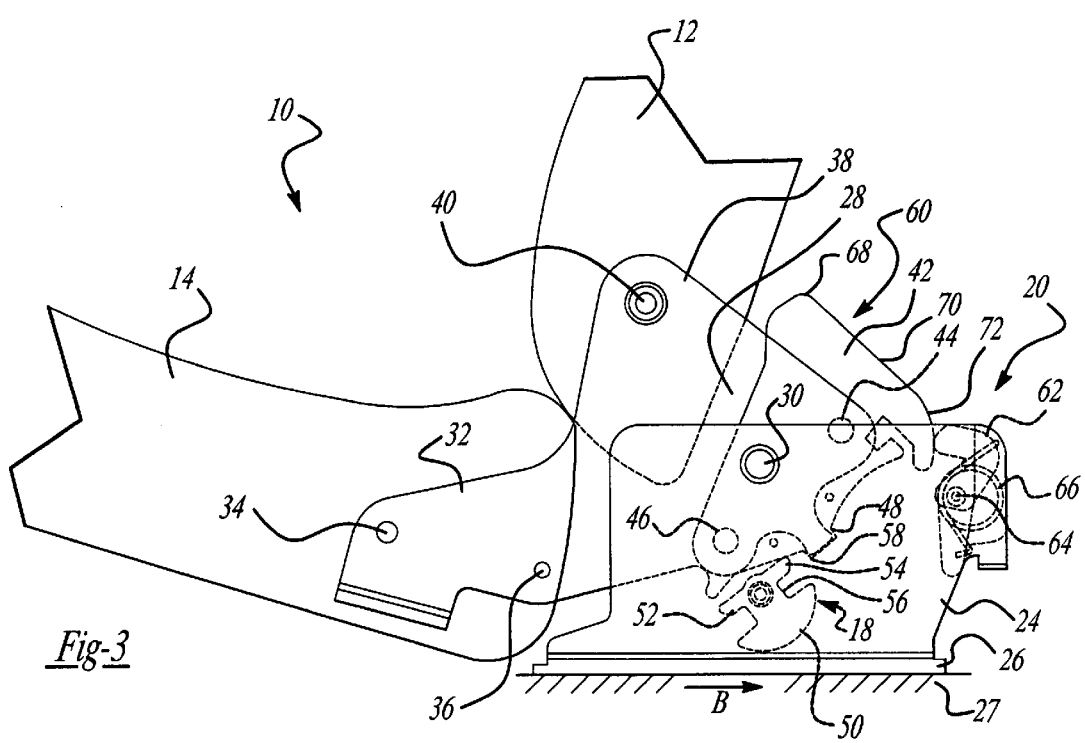
FIG. 3 is a detailed view of the inertia latch and spring detent means according to the principles of the present invention, with the seat bottom in the seating position.
Figure 4:
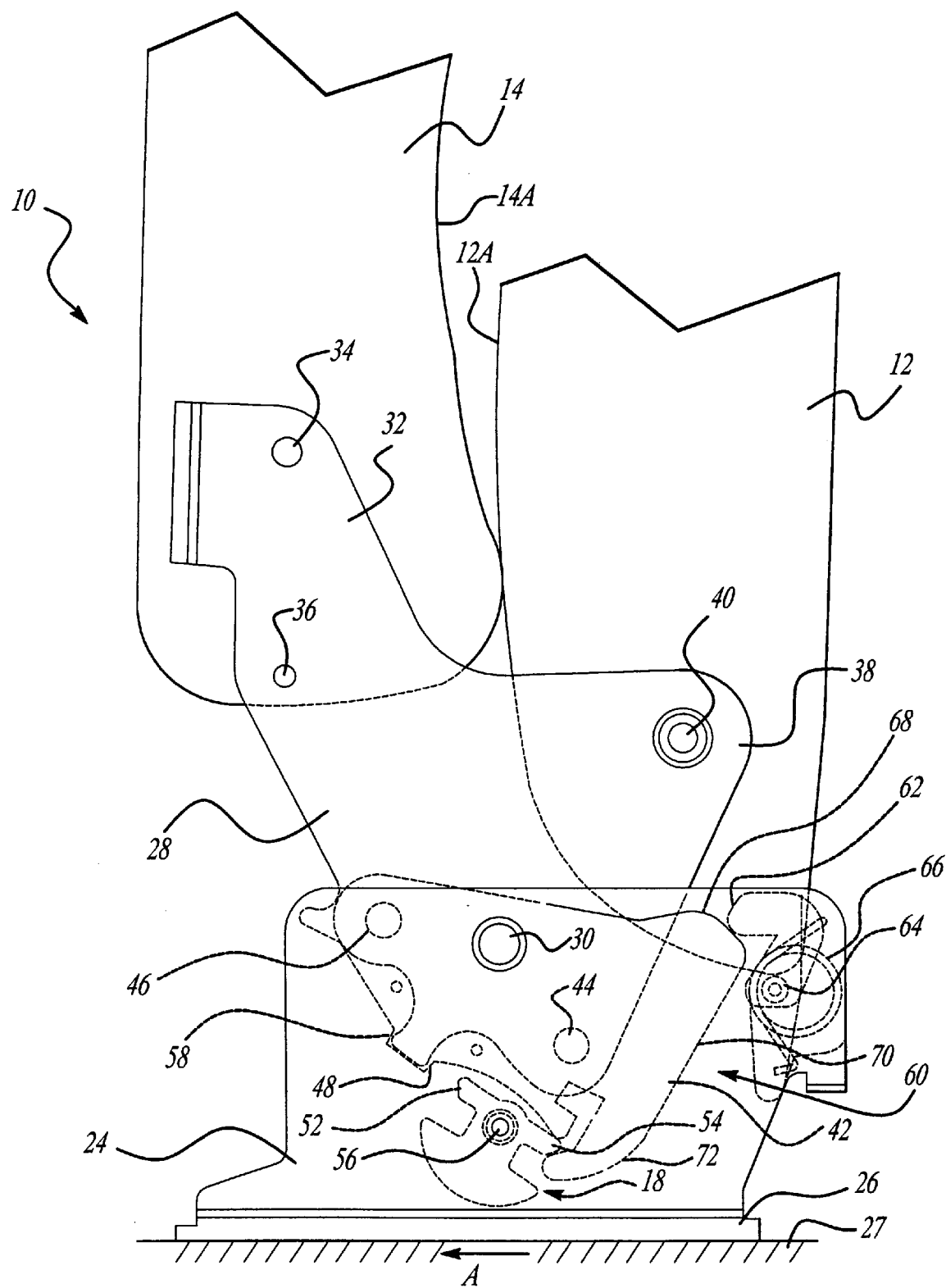
FIG. 4 is a detailed view of the inertia latch and detent mechanism according to the principles of the present invention, with the seat bottom in the folded upright position.

With reference to FIGS. 3 and 4, a detailed view of an inertia mechanism and spring detent mechanism according to the principles of the present invention will be described. As shown in FIG. 3, the seat assembly 10 includes a pair of spaced mounting brackets 24 having a base portion 26 which is securely mounted to the vehicle floor 27. A pivot bracket 28 is pivotally mounted between the mounting brackets 24 at pivot pin 30. The seat bottom 14 is fixedly mounted to a first arm portion 32 of pivot bracket 28 by fasteners 34, 36. The seat back 12 is pivotally mounted to a second arm portion 38 of the pivot bracket 28 via a pin 40.

A doubler plate 42 is fixedly attached to the pivot bracket 28 via fasteners 44 and 46. Doubler plate 42 pivots about pivot pin 30 along with pivot bracket 28. The doubler plate includes a catch portion 48 which is engaged by the inertia latch mechanism 18, in response to a rapid deceleration of the vehicle when the seat bottom is in the folded upright position, as shown in FIG. 4. The inertia mechanism 18 includes a weighted mass portion 50 and a pair of catch engaging portions 52, 54. The inertia latch mechanism 18 is pivotally mounted to the mounting brackets 24 by a pivot member 56. With reference to FIG. 4, during a rapid deceleration of the vehicle, the mass portion 50 tends to move in a forward direction, as indicated by Arrow A, thereby causing the inertia latch mechanism 18 to stay in the engaged position, as shown in FIG. 4, such that the catch engaging portion 52 remains in engagement with the catch portion 48 of doubler plate 42, thereby preventing the seat bottom 14 from moving forward from the upright folded position.

The pivot bracket 28 also includes a second catch portion 58 which is engagable by the catch engaging portion 54 of inertia latch mechanism 18 in response to a forward acceleration of the vehicle in order to prevent the seat bottom portion 14 from moving to the folded upright position. In particular, during a forward acceleration, such as may be caused by a rear impact on the vehicle, the mass portion 50 of inertia latch mechanism 18 tends to move in a rearward direction, as indicated by Arrow B, thereby causing the inertia latch mechanism 18 to remain in engagement with the second catch portion 58, as shown in FIG. 3. The catch engaging portion 54 engages the second catch portion 58 of the doubler plate 42 in order to prevent the seat bottom portion 14 from rotating away from the seating position (FIG. 3).

Doubler plate 42 includes a cam surface portion 60 which is engaged by detent mechanism 20. Detent mechanism 20 includes a detent plate 62 disposed between the mounting brackets 24 and rotatable about pivot 64 (detent plate 62 has a cross-section generally in the shape of a "7"). A spring 66 is mounted to the mounting brackets 24 and is provided for biasing the detent plate 62 against cam surface 60. Cam surface 60 includes a first surface portion 68 which is engaged by the detent plate 62 when the seat bottom 14 is in the folded upright position (FIG. 4). In order to move the seat bottom 14 away from the folded upright position, rotation of the pivot bracket 28 and doubler plate 42 causes the first surface portion 68 to press the detent member 62 against the biasing force of spring 66 until the intermediate second surface portion 70 of cam surface 60 is reached. Thus, the detent mechanism 20 provides a resistance to movement of the seat bottom 14 from the folded upright position.

The cam surface 60 of pivot bracket 28 is provided with a third surface portion 72 which is engaged by the detent member 62 when the seat bottom is in the seating position, as shown in FIG. 3. In order to move the seat bottom 14 from the seating position, the seat bottom 14 is lifted in an upward direction. The detent member 62 provides a resistance against rotation of pivot bracket 28 and doubler plate 42 as the detent member 62 is biased by the spring member 66. As the pivot bracket 28 and doubler plate 42 rotate such that the detent member 62 engages the intermediate second surface portion 70 of the cam surface 60, the resistance to rotation of the seat bottom 14 is substantially reduced.

According to the principles of the present invention, the folding seat assembly 10 is provided for a vehicle including a seat back 12 and a seat bottom 14 pivotally mounted relative to the seat back 12 and movable between a seating position and a folded upright position. A detent mechanism 20 provides a resistance to movement of the seat bottom 14 from the folded upright position and the seating position. An inertia latch mechanism 18 is provided for engaging the seat bottom 14 in the folded upright position and the seating position in response to a rapid acceleration or deceleration of the vehicle such as caused by a collision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:

a passenger compartment;

a seat assembly disposed in said passenger compartment, said seat assembly including a seat back extending transversely to a direction of travel of said vehicle and a seat bottom pivotally mounted relative to said seat back and movable between a seating position generally perpendicular to said seat back and a folded upright position opposing said seat back such that a top surface of said seat bottom is disposed opposite a front surface of said seat back, said seat assembly including an inertia latch mechanism for engaging said seat bottom in said folded upright position in response to a rapid deceleration in a forward direction of travel of said vehicle.

2. The vehicle according to claim 1, further comprising a detent mechanism for providing a resistance to movement of said seat bottom from said folded upright position.

3. The vehicle according to claim 2, wherein said detent mechanism provides a resistance to movement of said seat bottom from said seating position.

4. An extended cab pickup truck, comprising:

a passenger compartment having a front seat assembly and a rear seat assembly disposed along a rear of said passenger compartment;

said rear seat assembly including a seat back extending transversely to a direction of travel of said pickup truck and a seat bottom pivotally mounted relative to said seat back and movable between a seating position generally perpendicular to said seat back and a folded upright position opposing said seat back and an inertia latch mechanism for engaging said seat bottom in said folded upright position in response to a rapid deceleration in a forward direction of travel of said pickup truck.

5. The extended cab pickup truck according to claim 4, further comprising a detent mechanism for providing a resistance to movement of said seat bottom from said folded upright position.

6. The extended cab pickup truck according to claim 5, wherein said detent mechanism further provides a resistance to movement of said seat bottom from said seating position.

* * * * *

(12) EX PARTE REEXAMINATION CERTIFICATE (7541st)
United States Patent
Shea

(10) Number: US 6,012,771 C1
(45) Certificate Issued: Jun. 1, 2010

(54) SEAT FOLD MECHANISM

(75) Inventor: Paul H. Shea, Livonia, MI (US)

(73) Assignee: Chrysler Group LLC, Auburn Hills, MI (US)

Reexamination Request:
No. 90/009,209, Jul. 22, 2008

Reexamination Certificate for:
Patent No.: 6,012,771
Issued: Jan. 11, 2000
Appl. No.: 09/130,418
Filed: Aug. 6, 1998

(51) Int. Cl.
*B60N 2/42* (2006.01)
*B60N 2/02* (2006.01)

(52) U.S. Cl. ............... 297/216.1; 297/332; 297/336; 296/65.05; 296/68.1

(58) Field of Classification Search .............. None
See application file for complete search history.

(56) References Cited

U.S. PATENT DOCUMENTS

| 4,527,828 | A | * | 7/1985 | Groce et al. ............. 296/65.09 |
| 4,771,507 | A | * | 9/1988 | Draplin et al. ................ 16/297 |
| 5,498,052 | A | | 3/1996 | Severini et al. |
| 5,842,744 | A | | 12/1998 | Harmon |

* cited by examiner

*Primary Examiner*—Jeanne M Clark

(57) ABSTRACT

A folding seat assembly is provided for a vehicle including a seat back and a seat bottom pivotally mounted relative to the seat back and movable between a seating position and a folded upright position. A detent mechanism provides a resistance to movement of the seat bottom from the folded upright position and the seating position. An inertia latch mechanism is provided for engaging the seat bottom in the folded upright position in response to a rapid deceleration of the vehicle such as caused by a collision.

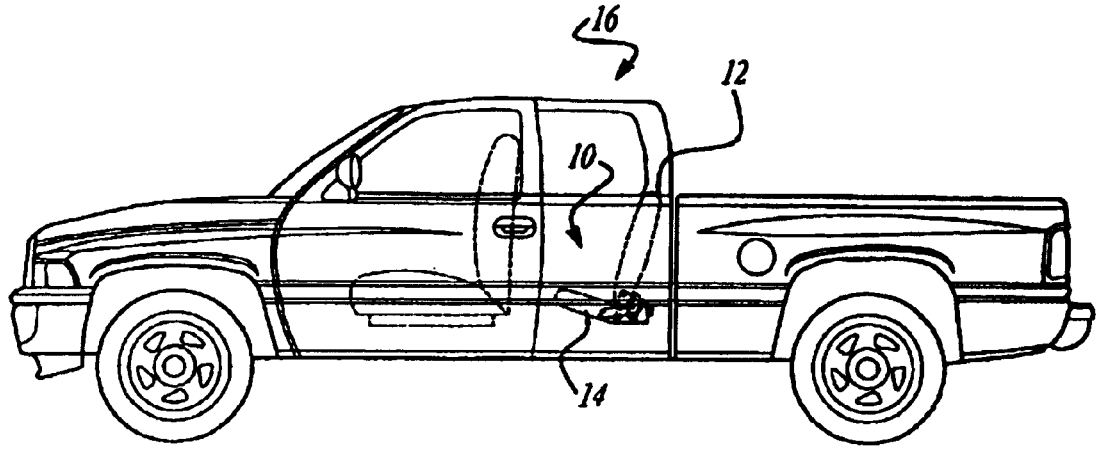

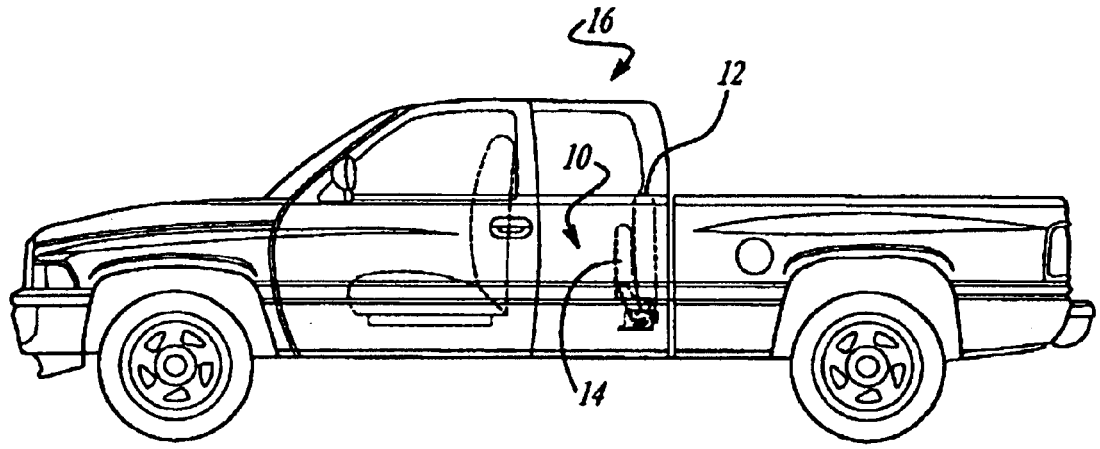

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*